United States Patent
Levilly

(10) Patent No.: US 9,754,380 B2
(45) Date of Patent: Sep. 5, 2017

(54) REMOTE OPERATED SELECTIVE TARGET TREATMENT SYSTEM

(71) Applicant: Philippe A. Levilly, Petitville, FL (US)

(72) Inventor: Philippe A. Levilly, Petitville, FL (US)

( * ) Notice: Subject to any disclaimer, the term of this patent is extended or adjusted under 35 U.S.C. 154(b) by 0 days.

(21) Appl. No.: 14/860,900

(22) Filed: Sep. 22, 2015

(65) Prior Publication Data

US 2016/0086346 A1    Mar. 24, 2016

(30) Foreign Application Priority Data

Sep. 24, 2014 (FR) ...................................... 14 59011

(51) Int. Cl.

| | |
|---|---|
| *G06T 7/20* | (2017.01) |
| *G06K 9/00* | (2006.01) |
| *G06F 17/30* | (2006.01) |
| *F41G 3/16* | (2006.01) |
| *B25J 9/16* | (2006.01) |
| *B25J 11/00* | (2006.01) |
| *F41G 5/06* | (2006.01) |
| *G06T 7/70* | (2017.01) |

(52) U.S. Cl.
CPC ............. *G06T 7/20* (2013.01); *B25J 9/1697* (2013.01); *B25J 11/002* (2013.01); *F41G 3/16* (2013.01); *F41G 3/165* (2013.01); *F41G 5/06* (2013.01); *G06F 17/30256* (2013.01); *G06K 9/00671* (2013.01); *G06T 7/70* (2017.01); *G06T 2207/10016* (2013.01); *Y10S 901/09* (2013.01)

(58) Field of Classification Search
CPC ... G06T 7/20; G06T 7/70; G06T 2207/10016; B25J 9/1697; B25J 11/002; F41G 3/16; F41G 3/165; F41G 5/06; G06F 17/30256; G06K 9/00671; Y10S 901/09
USPC ........................................................ 382/103
See application file for complete search history.

(56) References Cited

U.S. PATENT DOCUMENTS

| | | | |
|---|---|---|---|
| 2011/0181722 A1* | 7/2011 | Gnesda ................... | F41A 19/08 348/148 |
| 2014/0028856 A1* | 1/2014 | Ehrlich ................... | F41A 17/08 348/169 |

* cited by examiner

*Primary Examiner* — Amandeep Saini
(74) *Attorney, Agent, or Firm* — Faegre Baker Daniels LLP

(57) ABSTRACT

A remote operated selective target treatment system including a firing robot having a weapon and an optoelectronic sighting device, a central processing unit and a control screen displaying the prepared image of the target, and a control device. The central processing unit prepares the image intended for display, and includes an input module receiving digital images, an image analyzer receiving the image from the input module and detaching the target image from its environment, a modelling device modelling the contour of the image, a comparator connected to a library of silhouettes receiving the modelled image and checking it against the silhouettes, and an exclusion module receiving an image from the comparator and using a library of masks to apply a mask to the image and transmit the prepared image for display on screen.

7 Claims, 4 Drawing Sheets

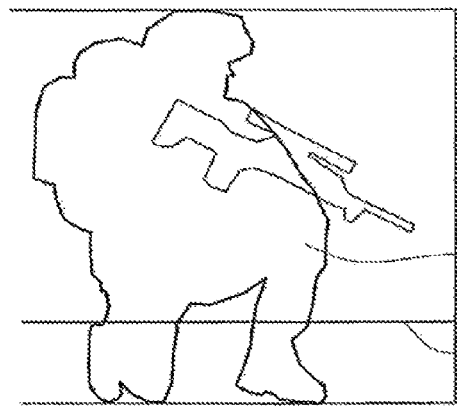
Fig. 5B
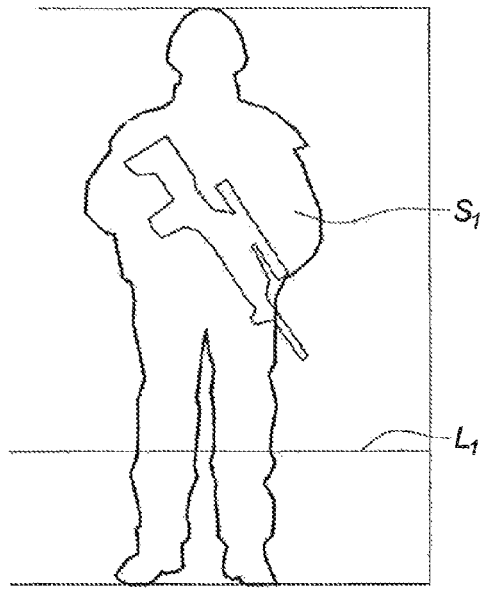
Fig. 5A
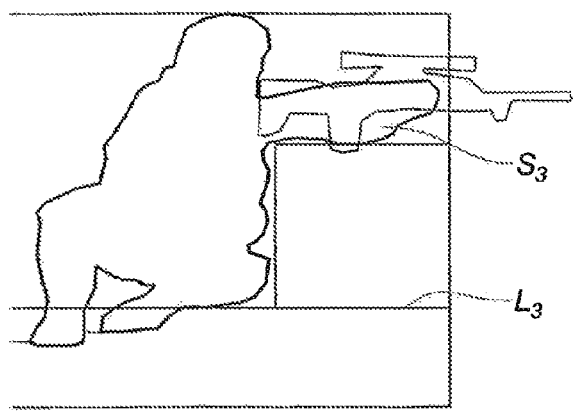
Fig. 5C
Fig. 5

REMOTE OPERATED SELECTIVE TARGET TREATMENT SYSTEM

CROSS-REFERENCE TO RELATED APPLICATIONS

This application claims priority to French Patent Application No. 1459011 filed Sep. 24, 2014, the entire disclosure of which is hereby explicitly incorporated by reference herein.

BACKGROUND OF THE INVENTION

1. Field of the Invention

The present invention refers to a remote operated target processing system comprising a firing robot having a weapon and an optoelectronic sighting device producing an image of the target, a control device for directing the sighting device and controlling the weapon and a central processing unit managing the operation of the optoelectronic sighing device and the weapon.

2. Description of the Related Art

There are many known target tracking and neutralisation systems, generally particularly complicated, based on the geo-localizing of a target whose coordinates are entered into a tracking system guiding the weapon towards the target or near it.

A particularly simple and efficient remote operated target processing system is described in document FR 12 53 382, capable of neutralising the target after detecting it. The system includes a firing robot comprising a weapon associated with an optoelectric sighting part giving an image of the target, sensors detecting the relative position of the weapon, and actuators setting up the weapon and a central processing unit receiving instructions and signals from the sensors to generate the control signals of the actuators and weapon.

SUMMARY OF THE INVENTION

The present invention provides a particularly simple and flexibly implemented selective target processing system at a low cost for the investor and in terms of maintenance, offering efficient management of the lethality threshold in target processing.

To accomplish this, the purpose of the invention is a remote-operated target processing system M, comprising a firing robot comprising a weapon and an optoelectronic sighting device producing an image of target M, a control device for directing the sighting device and controlling the weapon and a central processing unit managing the operation of the optoelectronic sighting device and the weapon, a remote operated system characterised in that the central processing unit with the computers and memories for preparing the image intended for display on the control module screen includes: an input module receiving digital images from the optoelectronic sighting device, an image analyser receiving the image of the input module and detaching the target image from its environment to form an image, a modelling device receiving the image from the analyser to model the contour of the image and obtain a modelled image, a comparator connected to a library of silhouettes receiving the models image and checking it against the silhouettes Si to select the silhouettes closest to the modelled image, an exclusion module receiving the image from the comparator, a library of masks to which the exclusion module has access to search among them for the one corresponding most closely to the image supplied by the comparator in order to overlay this mask Cp on the image/silhouette and transmit die prepared image IP to the processing device for its display on the screen.

Generally speaking, the remote operated target processing system, thanks to its outstanding firing, accuracy, allows the selective processing of the target while managing a lethality threshold. The weapon can be any weapon whatsoever, installed on the robot and whose optoelectronic device is compatible with the functions integrated into the central processing unit.

In one form thereof, the present invention provides a remote operated selective target treatment system M including a firing robot having a weapon and an optoelectronic sighting device producing an image (IG) of target M:
  a control device for guiding the sighting device and controlling the weapon and a central processing unit controlling the operation of the optoelectronic sighting device and of the weapon; and
  means of identifying the silhouette of an individual by comparing it with recorded silhouettes; and
  a remote operated system characterised in that central processing unit with computers and memories for preparing the image intended for display on screen of control module includes:
  an input module receiving the images IG from the optoelectronic sighting device;
  an image analyser receiving the image IG from input module and detaching the image of the target individual (M) from its environment to form an image ID;
  a modelling device receiving image ID from the analyser to model the contour of the image of an individual and obtain a modelled image IM;
  a comparator or connected to a library of individual silhouettes receiving, the modelled image IM and checking it against the silhouettes Si to select the silhouette Sp coming closest to the modelled image;
  an exclusion module receiving an image from the comparator; and
  a library of exclusion masks to which the exclusion module has access to seek among the exclusion masks Ci, the mask Cp best corresponding to the image SR supplied by the comparator to overlay this mask Cp over image/silhouette Sp and transmit the prepared image IP to the processing device for its display on the screen.

BRIEF DESCRIPTION OF TIME DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 5 shows in its parts 5A, 5B, 5C three target silhouettes in the standing position viewed from the front, in the kneeling position viewed from the side and in the squatting position viewed from the side.

Figure 1:
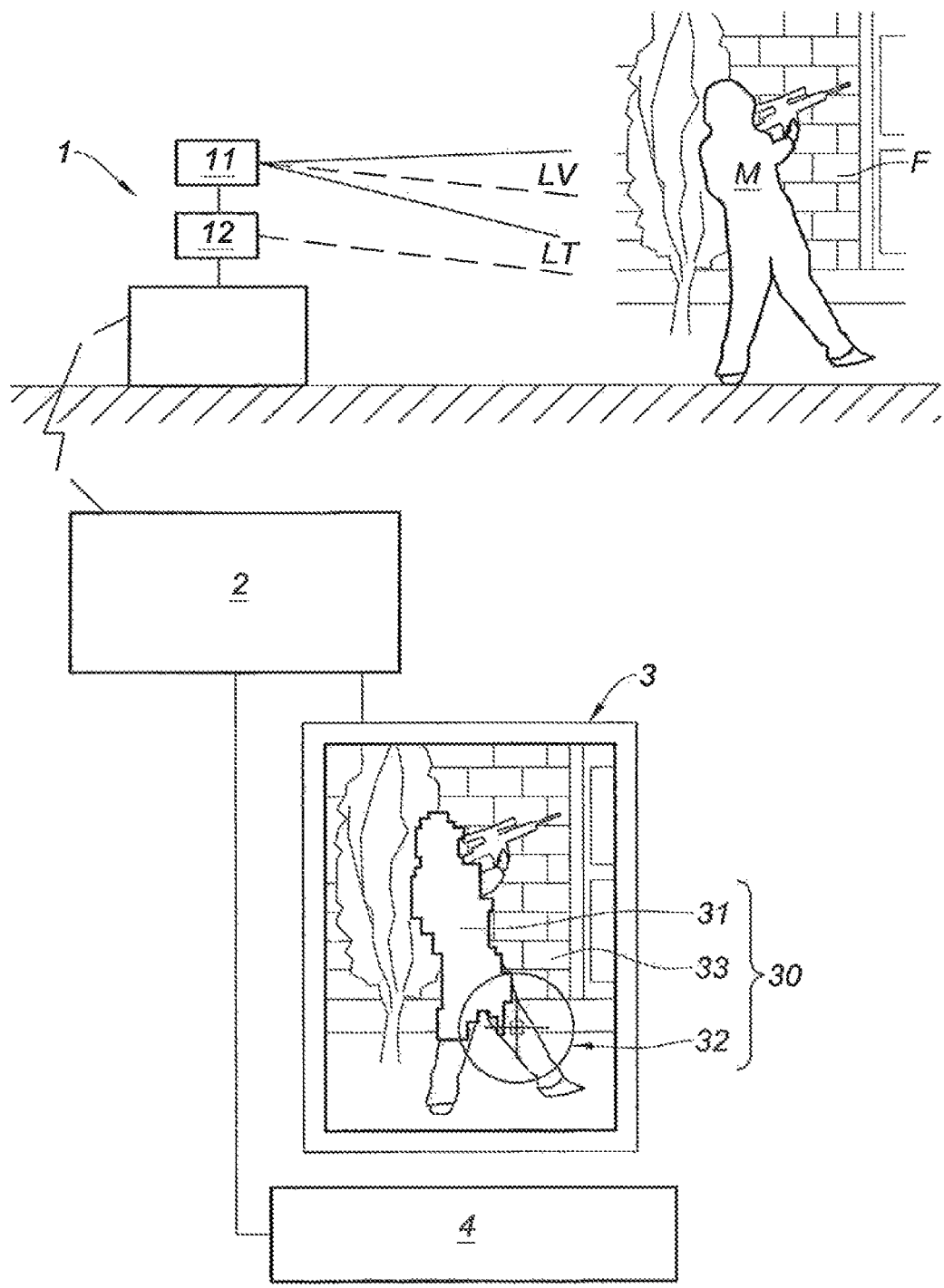
FIG. 1 is an overall diagram of the system according to the invention.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

FIG. 1 shows a remote operated target processing system including a firing robot 1 with an optoelectronic sighting device 11 referred to in the following as the sighting device 11, and a weapon 12. Firing robot 1 is connected preferably by an aerial link (wireless link) such as an infrared link or a radio link to a central processing unit 2 itself connected to a display screen 3 and a control device 4 such as a keyboard and a mouse or a joystick or more generally an operating device. The target (the individual) to be neutralised M, situated in the environment F is stationary, that is immobile or almost immobile, or it is moving. The neutralisation of the target M consists in firing at the non-lethal part of the target M immediately after locating the target and/or after following it in order to neutralise it at the right time.

Firing robot 1 is a fixed or mobile robot. Its equipment comprises means of movement and actuators, not described in detail, comprising a sighting device 11 controlled directly by the operator using the control device 4 through central processing unit 2 or automatically by central processing unit 2 in the event of the automatic tracking of target M.

Weapon 12 is actuated by a central processing unit 2 under the control of the operator using his control device 4.

Weapon 12 has a firing line LT and a sighting device 11 having a high sighting line materialized by a digital reticle 32 on the displayed image 30 taken by the sighting device 11. The sighting line is not locked on the axis of the image; it is locked at the beginning of the target search to orientate the sighting device 11 onto target M and its environment E. But for the processing of the target, the sighting line is moved freely in image 30 by the operator while image 30 (prepared image) remains stationary. The firing line LT is slaved onto the high sighting line in order to reach the point of impact aimed at in the target. The system has means of correction to correct for any deviations between the point sighted by the LV line and the point of impact of the firing line LT on the target. The corrections are made by the central processing unit 2.

The central processing unit 2 includes means of image analysis and processing, to supply the operator, on screen 3, with a prepared target with a mask outlining the exclusion area 31 in which firing is not authorised (or is impossible) leaving free only the nonlethal parts of the target, such as the lower limbs and upper limbs of the target.

Image background 33 can be the image of the environment F of target M or a contrasting background better highlighting the target contour. Advantageously, the image of the real background (F) is preserved if the target environment (F) is important with respect the time or the decision to neutralise the target.

The exclusion area (digital 31) established as described subsequently is a prohibited area defined by the central processing unit 2 and within which the operator is unable to point his fire. He can aim outside this prohibited area as demonstrated by reticle which appears on screen 3. Note that the operator controls the general direction of the optoelectronic device 11 producing an image within which the reticle 32 corresponding to the sighting line LV can itself be moved. The firing line LT is slaved onto this LV line. The preparation of the image of target M to obtain prepared image 30 appearing on screen 3 with digital mask 31 and background 33 will be described by means of FIG. 2.

Figure 2:
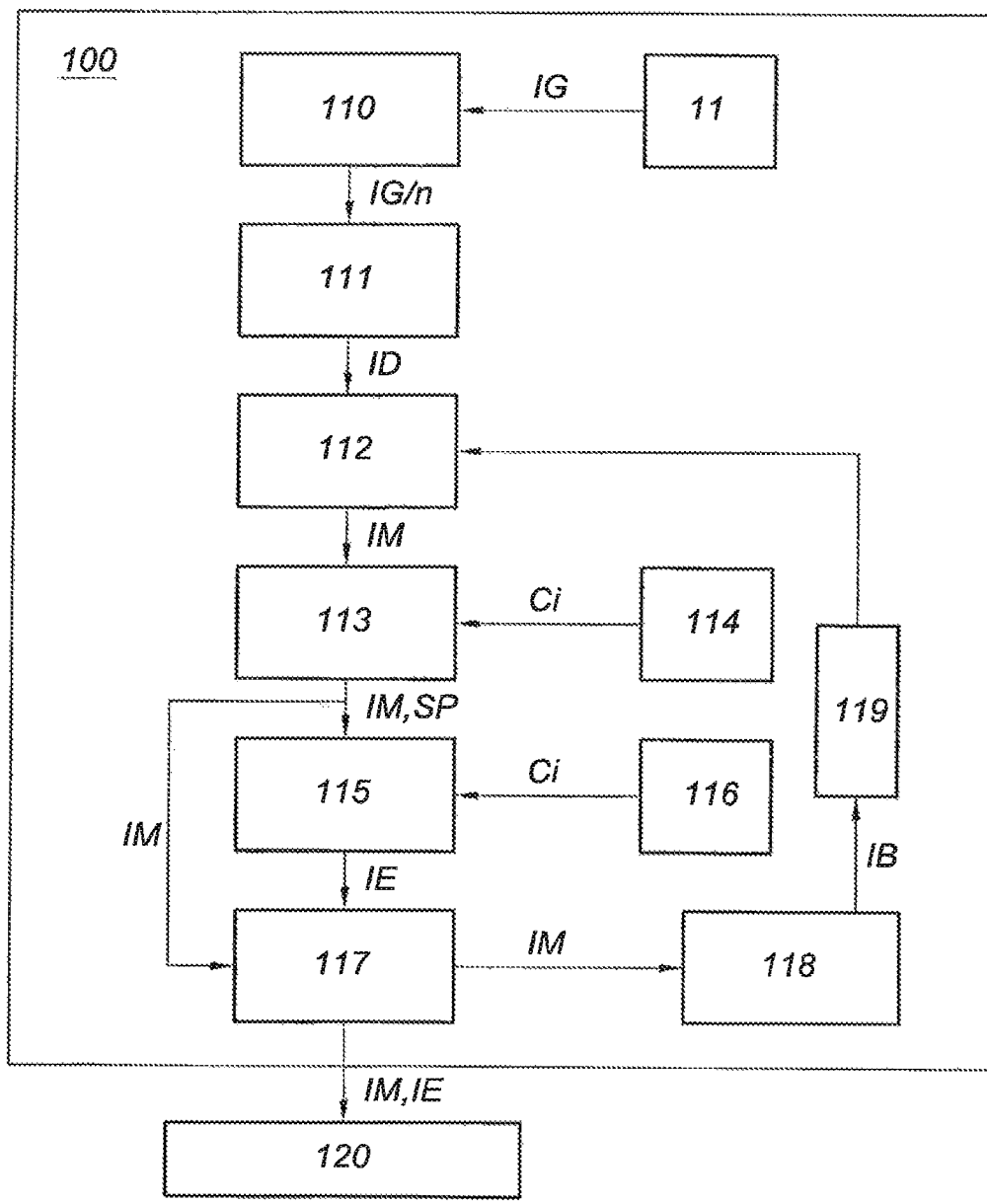
FIG. 2 is a block diagram of the image preparation part of the invention system.

According to FIG. 2, the optoelectronic sighting devices 11, directed by the operator, supplies an overall image IG of target M in its environment F, that is, target M with background F on input module 111 of central processing unit 2.

Input module 110 receives the succession of images at the image-shooting frequency of the optoelectronic device 11 and transmits only one image out of n images to the preparation modules, depending on the time required for the preparation of each image.

Central processing unit 2 also includes means of preparing the following images, in addition to means of calculation and memories:

An image analyser 111;
An image modelling device 112;
A comparator 113;
A library of non-ambiguous silhouettes 114;
An exclusion module 115;
A library of exclusion masks 116;
A switching device 117;
A ringing module 118; and
A target tracking module 119.

The modules of central processing unit 2 consist of circuits or programs in central processing unit 2 or of peripheral equipment.

The retained overall mage IG/n is transmitted to analyser 111 to detach the image of the target from the background. Image ID of the detached target is supplied to modelling device 112 which models the target retaining only its contour and thus simplifying it. Modelled image IM is transmitted to a comparator 113 connected to a library of silhouettes 114 to compare the modelled image against the silhouettes Si and identify the silhouette Sp coming closest to the modelled image IM.

The silhouettes Si in the library depict the attitudes of an individual seen from the front, from the side or from the back with the individual standing with his legs and arms in different positions, squatting, kneeling, seated or prone. The chosen silhouette Sp and/or the modelled image IM are transmitted to the exclusion module 115 which applies an exclusion mask Ci supplied by a library of exclusion masks 116.

The exclusion module 115 applies one or several exclusion masks Ci to the modelled image IM using silhouette Sp. These exclusion masks define the areas in which firing is prohibited. The image with the exclusion mask IE is transmitted by processing device 120 consisting of control screen 3 and control device 4 used by the operator to trigger firing in a chosen zone not excluded from the target.

Preferably, exclusion masks Ci are associated with silhouettes in a predefined manner, covering the vital parts of the silhouette. The masks can also correspond to an upper fraction of the target height to exclude the entire upper part or the lower part limited to the legs. This type of mask is easy to apply by image processing but is unsuitable for anything other than a standing or seated target. A mask like this corresponds to a separation line situated, for instance, in the lower quarter of the target. This zone corresponds approximately to the legs of the target.

The other type of more accurate exclusion mask defines not only a lower limit but also one or several side limits so as to maintain in the exclusion zone only the torso and head of the silhouette and allow firing at the arms and the legs.

Image IE is applied to the processing module 120 through switch 117 which is also capable of recycling the image for image tracking if it is on the move. Switch 117 can also receive the modelled image IM directly without the exclusion mask.

Processing module 120 receives the modelled image with or without the mask IM, IE, which is a constantly renewed image. It differs from the real attitude of the target only in the image preparation time supplied by the optoelectronic sighting device 114 so that the final image appearing in each cycle on screen 3 is sufficiently close to the real image of the target at that time for firing to take place with high accuracy regarding the definition of the exclusion zone and the authorised zones.

As an alternative, if the processing of the target has to be postponed for any reasons and if the system must first operate by the surveillance of the target (target tracking), image IM is transmitted to a ringing module 118 which assigns reference points to the target contour. Preferably, this target contour is the total contour and not the contour to which a mask can be attributed to identify more easily and with higher security the moved or modified parts of the target. Ringed image IB is transmitted in return by modelling device 112, using tracking module 119 to renew the image of the ringed module by the new image supplied by the optoelectronic sighting device 11.

The points of reference associated with the contour of the target link with the characteristic points of the target which can easily be found in a future image of the target having changed slightly its position or attitude so as to define the modified contour of the target, allowing its comparison with a silhouette for checking to avoid any ambiguity in the interpretation of the target, and assigning to it a mask adapted to this new attitude.

The image with the exclusion mask IE is transmitted to the processing module 120 and the renewed ringed image IB resulting from the comparison (113) is recycled through switch 117 to the ringing module 118 which can modify the references. In another process, a new non-ringed image arrives in the ringing module 118 to be provided with references and to be recycled.

To summarise, for a target tracking action, the ringed image with references associated with the characteristic points of the target can track the target automatically as it moves and apply to it, at the chosen moment, the exclusion mask adapted to its silhouette and allow the processing of the target.

The calculations used for this type of image will be simple and fast, advantageous for increasing the frequency of the prepared images and giving greater target processing accuracy.

Target processing in the tracking mode can also be simplified to confine it simply to the ringed image and this reduce the calculation time, applying the exclusion criteria only to the controls of the operator who has decided to process the target.

Figure 3:
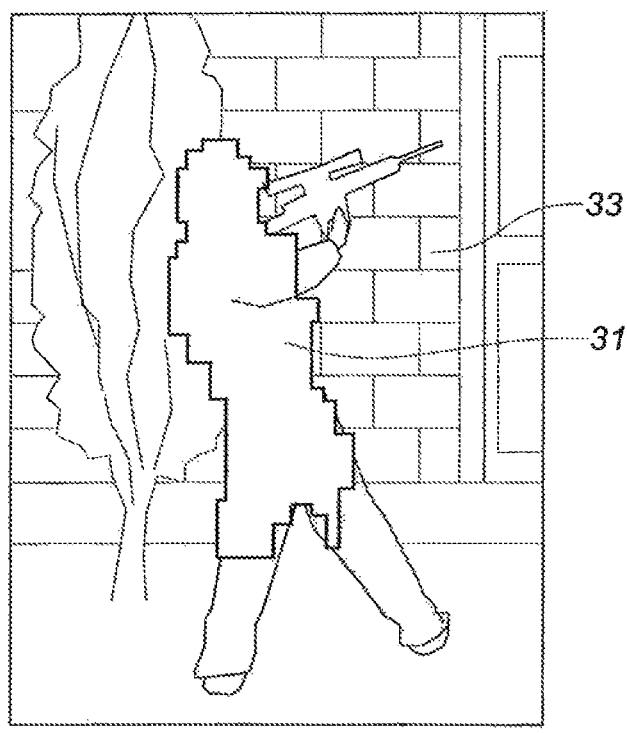
FIG. 3 is arm image of a target with its mask in the environment.

FIG. 3 is an image showing mask 31 applied to the image and background 33 corresponding to the real environment of the target.

Figure 4:
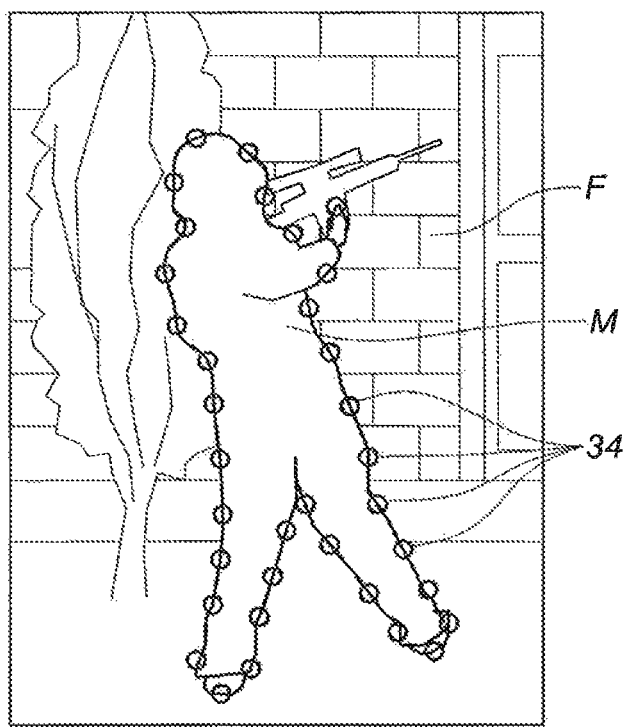
FIG. 4 is an image of a ringed target with its reference points in its environment.

FIG. 4 shows target M in environment F with the contour provided with reference points 34 so as to ring the target and track it in its movements by comparing successive images.

FIG. 5 illustrates in its parts 5A, 5B, 5C three examples of silhouettes S1, S2, S3 from the silhouette library. For these silhouettes, the mask is the entire part above the line L1, L2, L3 demarcating the upper lethal part of the target to exclude this upper part from the entire image and allow firing only in the lower part under line L1, L2, L3 in the various images.

LIST OF MAIN COMPONENTS

1 Firing robot
2 Central processing unit
3 Screen
4 Control device
11 Optoelectronic vision and sighting device
12 Weapon
110 Input
111 Image analyser
112 Modelling device
113 Comparator
114 Silhouette library
115 Exclusion module
116 Mask library
117 Switch
118 Ring module
119 Target tracking module
120 Processing module with screen and control device
IG Overall digital image
M Target
F Image background
ID Detached image
IM Modelled image
Si Silhouette
Sp Silhouette
SR Selected silhouette
Ci Exclusion mask
IE Image with exclusion mask While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A remote operated selective target treatment system, comprising:
   a firing robot having a weapon;
   an optoelectronic sighting device producing an image of a target;
   a control device for guiding the sighting device and controlling the weapon;
   a central processing unit controlling the operation of the optoelectronic sighting device and of the weapon;
   means for identifying a silhouette of an individual human target by comparing the silhouette with recorded silhouettes;
   a remote operated system including the central processing unit for preparing an image intended for display on a screen of a control module, comprising:
      an input module receiving an image from the optoelectronic sighting device;
      an image analyzer receiving an image from input module and detaching the image of the target individual from its environment to form a detached image;
      a modelling device receiving the detached image from the analyzer to model the contour of the detached image of an individual and obtain a modelled image;
      a comparator connected to a library of individual silhouettes receiving the modelled image and checking the modelled image against the individual silhouettes to select a selected silhouette corresponding to the modelled image;

an exclusion module receiving a comparator image from the comparator, the comparator image including the selected silhouette;

a library of exclusion masks to which the exclusion module has access to seek among the exclusion masks, a selected mask corresponding to the selected silhouette in the comparator image to overlay the selected mask over the selected silhouette in the comparator image to form an overlaid image and transmit the overlaid image to the processing device for display of the overlaid image on the screen, the overlaid image including only non-lethal parts of the individual human target which are not covered by the selected exclusion mask.

2. The system of claim 1, wherein the input module transmits to the analyzer only a single image from the siting device when the analyzer has finished analyzing a number of images.

3. The system of claim 1, further comprising a ringing module for assigning to the modelled image reference points for tracking a moving target.

4. The system of claim 3, wherein the ringing module recycles a ringed image for comparison with a following modelled image in order to transfer the reference points to following modelled image.

5. The system of claim 1, wherein in the overlaid image, the exclusion masks cover surfaces corresponding to a bust and head portion of the selected silhouette.

6. The system of claim 1, wherein the exclusion masks exclude from processing a region of the individual human target delineated by a limit line in the overlaid image.

7. The system of claim 1, wherein in the overlaid image, the non-lethal parts of the individual human target which are not covered by the selected exclusion mask include at least one of an upper limb and a lower limb of the individual human target.

* * * * *